United States Patent [19]

Ueno

[11] Patent Number: 5,014,767

[45] Date of Patent: May 14, 1991

[54] MULTI-DRIVE INJECTION APPARATUS

[75] Inventor: Toyoaki Ueno, Yamaguchi, Japan

[73] Assignee: UBE Industries, Ltd., Ube, Japan

[21] Appl. No.: 471,379

[22] Filed: Jan. 29, 1990

Related U.S. Application Data

[62] Division of Ser. No. 295,520, Jan. 11, 1989, Pat. No. 4,980,394.

[30] Foreign Application Priority Data

Jan. 30, 1989 [JP]   Japan ................................ 1-20053

[51] Int. Cl.$^5$ .................... B22D 33/04; B22D 17/00; B29C 45/07
[52] U.S. Cl. ................................. 164/312; 164/137; 164/339; 425/574; 425/149
[58] Field of Search ............... 164/137, 312, 314, 313, 164/315, 339, 342, 343, 341, 120; 425/574 X, 145, 149 X, 590, 451.2

[56] References Cited

U.S. PATENT DOCUMENTS

| | | | |
|---|---|---|---|
| 2,484,344 | 10/1949 | Hiller et al. | 164/312 |
| 3,433,290 | 3/1969 | Eggenberger | 425/590 |
| 4,088,178 | 5/1978 | Ueno et al. | 164/314 |
| 4,124,343 | 11/1978 | Makinson et al. | 425/574 |
| 4,287,935 | 9/1981 | Ueno et al. | 164/314 |
| 4,356,858 | 11/1982 | Perrella | 164/154 |
| 4,655,274 | 4/1987 | Dannoura | 164/341 |
| 4,741,379 | 5/1988 | Dannoura | 164/312 |
| 4,842,038 | 6/1989 | Fujino et al. | 164/312 |
| 4,844,146 | 7/1989 | Kikuchi | 164/120 |
| 4,932,458 | 6/1990 | Iwamoto | 164/120 |
| 4,955,426 | 9/1990 | Akimoto | 164/139 |

FOREIGN PATENT DOCUMENTS

| | | | |
|---|---|---|---|
| 2017951 | 4/1971 | Fed. Rep. of Germany | 164/319 |
| 57-50266 | 3/1982 | Japan | 164/120 |
| 63-256257 | 10/1988 | Japan | 164/312 |
| 115256 | 1/1989 | Japan | 164/312 |
| 2128541 | 5/1984 | United Kingdom | 425/451.2 |
| 2194473 | 3/1988 | United Kingdom | 164/312 |

Primary Examiner—Richard K. Seidel
Assistant Examiner—Rex E. Pelto
Attorney, Agent, or Firm—Blakely, Sokoloff, Taylor & Zafman

[57] ABSTRACT

An injection apparatus includes a plunger, an injection sleeve, a sleeve frame, and a rotational-linear motion transmission mechanism. The plunger is supported at a substantially central portion of a supporting frame. The injection sleeve is provided to be movable forward-/backward with respect to the supporting frame and receives a distal end portion of the plunger such that the distal end portion can move forward/backward. The sleeve frame supports the injection sleeve. The rotational-linear motion transmission mechanism is arranged between a motor and the supporting frame and converts a rotational motion into a linear motion.

15 Claims, 5 Drawing Sheets

MULTI-DRIVE INJECTION APPARATUS

BACKGROUND OF THE INVENTION

The present invention relates to an injection apparatus for injecting a molten metal into a die cavity.

Injection molding machines such as die casting machines are classified into a vertical casting type in which a molten metal is injected upward into a die cavity and a horizontal casting type in which a molten metal is laterally injected into a cavity. Of these two types, the vertical casting type is generally constituted as follows. That is, an injection frame supported by a machine base is suspended in a pit beneath a floor provided under metal molds. An entire injection apparatus is supported by the injection frame so as to be set upright or tilted. This injection apparatus includes an injection cylinder connected to a hydraulic device, an injection sleeve supported concentrically with the injection cylinder by a vertically movable sleeve frame at the injection cylinder side, and a plunger coupled to a piston rod of the injection cylinder via a coupling and having a plunger tip at its distal end which is inserted to be movable forward/backward in an inner hole of the injection sleeve. The injection sleeve of the injection apparatus is tilted by a tilting cylinder, and a molten metal is teemed therein. The injection cylinder is then raised by the tilting cylinder, moved upward together with the sleeve frame by an elevating cylinder, and connected to a stationary sleeve at the metal mold side. Thereafter, when an oil is supplied to the injection cylinder, the plunger is moved upward together with the piston rod, and the molten metal in the injection sleeve is pushed by the plunger tip and injected into the die cavity via the stationary sleeve. After the molten metal is solidified, a cast product is obtained. Vertical die casting machines of this type are disclosed in, e.g., U.S. Pat. Nos. 4,088,178, 2,454,961 and 4,655,274.

In such a conventional injection apparatus, however, an injection cylinder is hydraulically activated. Therefore, since the entire apparatus is large in size, a large installation space including conduits is required, and its controllability is degraded.

SUMMARY OF THE INVENTION

It is, therefore, an object of the present invention to provide an injection apparatus having a smaller size and better controllability than those of conventional apparatuses.

In order to achieve the above object of the present invention, there is provided an injection apparatus comprising a plunger supported at a substantially central portion of a supporting frame, an injection sleeve, provided to be movable forward/backward with respect to the supporting frame, for receiving a distal end portion of the plunger such that the distal end portion can move forward/backward, a sleeve frame for supporting the injection sleeve, and a rotational-linear motion transmission mechanism, arranged between a motor and the supporting frame, for converting a rotational motion into a linear motion.

In addition, in the apparatus according to the present invention, the rotational-linear motion transmission mechanism comprises a screw shaft to be rotated by the motor, a plurality of balls to be engaged with a spiral groove of the screw shaft, and a ball holder fixed to the supporting frame to support the balls.

After the molten metal is teemed into the injection sleeve, the injection sleeve is moved forward together with the plunger tip and connected to the stationary sleeve at the metal mold side. Thereafter, the supporting frame is driven by the motor via the rotational-linear motion transmission mechanism, or the screw shaft is rotationally driven in synchronism with each other to move the ball holder forward together with the supporting frame so that the balls roll in the spiral groove. As a result, the plunger supported by the supporting frame moves forward, and the molten metal in the injection sleeve is pushed by the plunger tip and injected into the die cavity.

BRIEF DESCRIPTION OF THE DRAWINGS

FIGS. 3 and 4 show an embodiment of an injection apparatus according to the present invention, in which FIG. 3 is a plan view showing the injection apparatus, and FIG. 4 is a longitudinal sectional view showing the injection apparatus taken along the line IV—IV of FIG. 3.

DETAILED DESCRIPTION OF THE PREFERRED EMBODIMENTS

Figure 1:
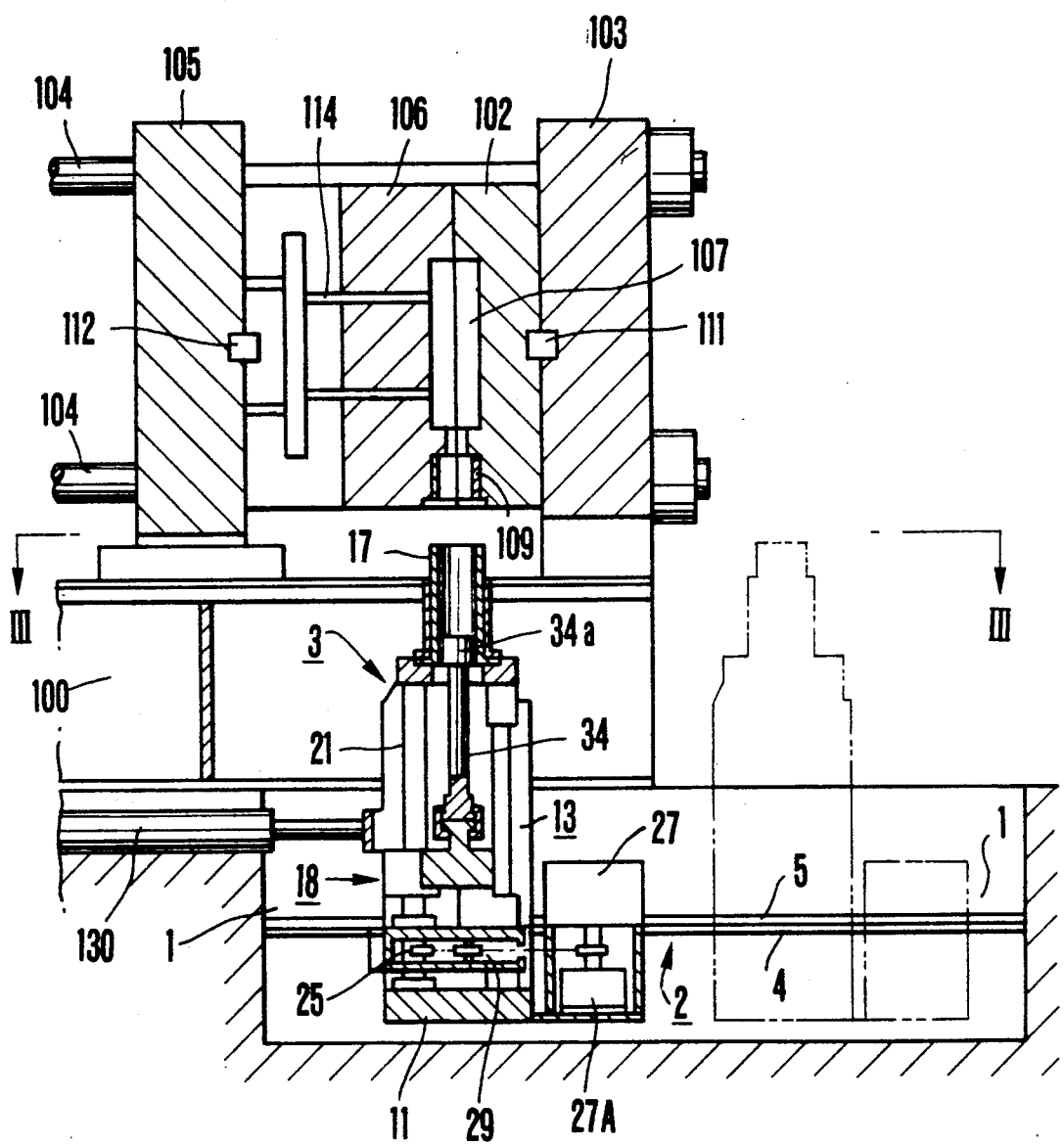
FIG. 1 is a sectional view showing basic arrangements of a vertical die casting machine and an injection apparatus according to an embodiment of the present invention.
Figure 2:
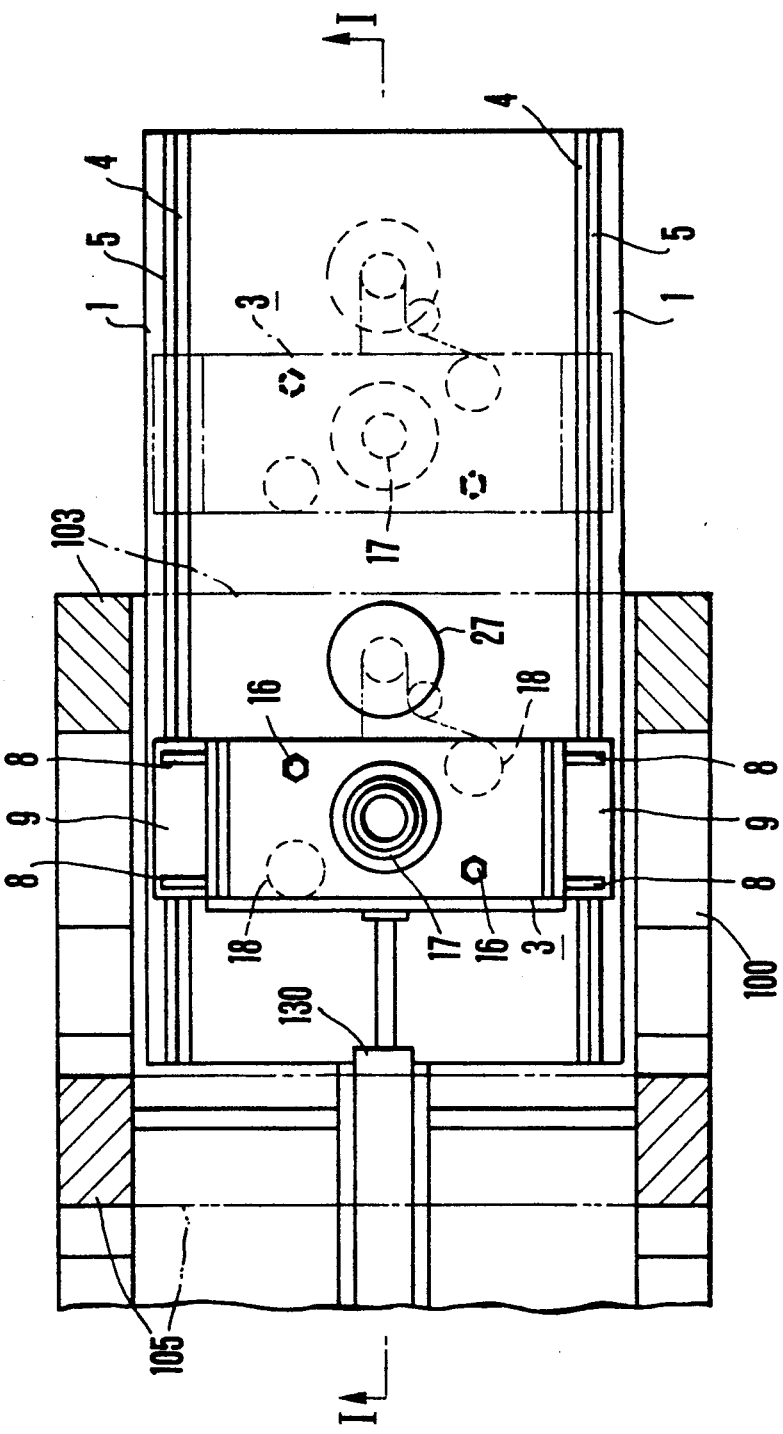
FIG. 2 is a sectional view taken along the line II—II of FIG. 1.
Figure 3:
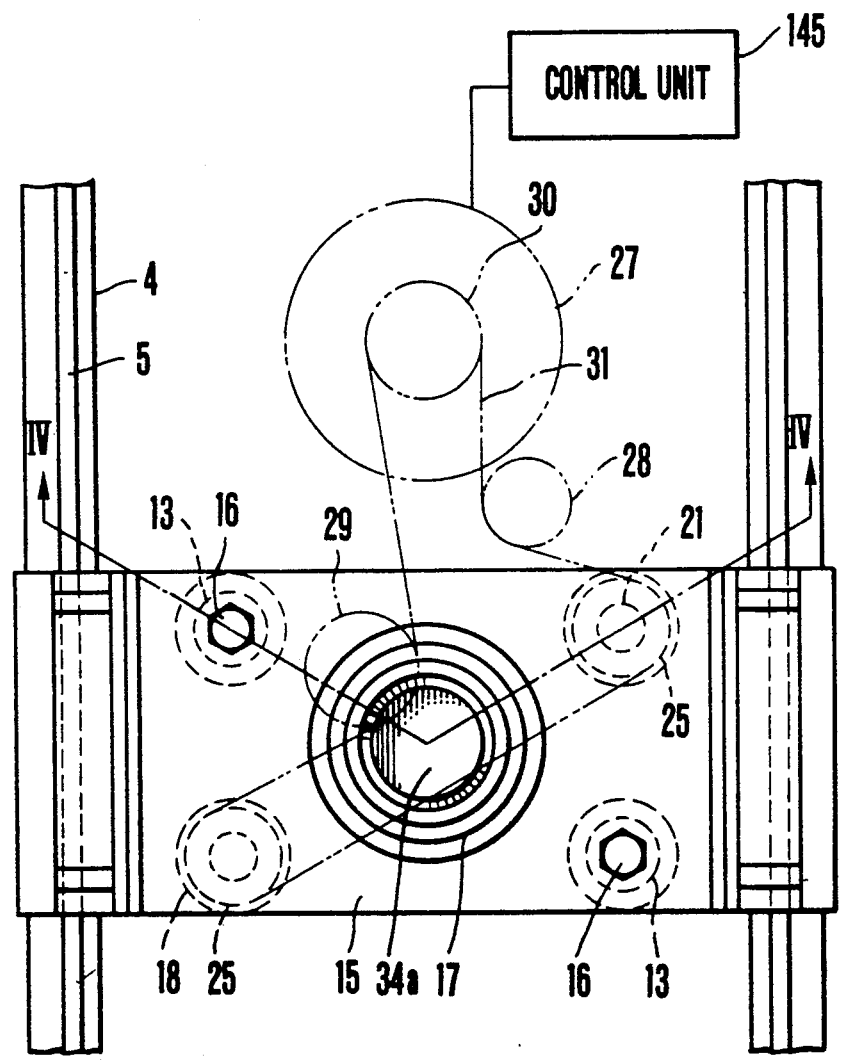

FIGS. 1 to 4 show basic arrangements of a vertical die casting machine according to an embodiment of the present invention and an injection apparatus for the machine. Referring to FIGS. 1 to 4, this die casting machine comprises, on its machine base 100, a vertically secured stationary platen 103 mounting a stationary metal mold 102, a movable platen 105 which moves along a plurality of columns or tie bars 104 extending horizontally from the stationary platen 103, and a movable metal mold 106 which moves from the movable platen 105 toward the stationary platen 102 to form a cavity 107. Reference numeral 109 denotes a split sleeve; 111 and 112, keys for preventing the vertical movement of the metal molds 102 and 106, respectively; and 114, a push-out sleeve for removing a cast product from the movable metal mold 106. These parts are basic elements constituting the die casting machine.

A pair of linear guides 2 (see FIG. 1) are secured to a frame 1 provided below the die casting machine. An injection apparatus generally denoted by reference numeral 3 is guided by the linear guides 2 to horizontally move between an injection position located below the metal molds and a metal mold injection position indicated by alternate long and two short dashed lines, as shown in FIG. 1. That is, each linear guide 2 includes an elongated rail 5 (see FIG. 4) supported by a supporting plate 4 at the frame 1 side and having a substantially square section. As clearly shown in FIG. 4, a plurality of balls 6 are held in ball grooves formed in both the side surfaces of the rail 5 and roll therein. A plurality of ball holders 9 each having an inverted U-shaped section and side surfaces protected by covers (not shown) are fixed to a cylindrical member 7 of the injection cylinder 3 via a reinforcing member 8. A ball groove for holding the balls 6 is formed in the inner surface of each ball holder 9. With this arrangement, when the injection apparatus 3 is driven by a driving unit 130 including a cylinder secured to the frame 11, the apparatus 3 smoothly moves while the balls 6 roll in the ball grooves.

The injection apparatus 3 supported as described above includes an annular upper frame 10 secured to the upper end of the cylindrical member 7 and a disc-like lower frame 11 secured to the lower end thereof. A ram portion 13a of an elevating shaft 13 extending upward is fitted to be movable upward/downward in a ram hole 12a of an elevating cylinder 12 provided at a position where an outer circumferential portion of the lower frame 11 is divided into two parts in the circumferential direction. An oil supply source 135 is connected to the ram hole 12a of the elevating cylinder 12 via a flexible pipe. The elevating shaft 13 is axially supported to be movable upward/downward by the upper frame 10 via a linear ball bearing 14, and a sleeve frame 15 having a substantially rectangular shape is secured to the upper end portion of the elevating shaft 13 by a plurality of bolts 16. A cylindrical injection sleeve 17 is fixed to a central portion of the sleeve frame 15 so as to be concentrical with a metal mold stationary sleeve 109 provided above the injection sleeve 17. When an oil is supplied from the oil supply source 135 to a lower portion of the ram hole 12a of the elevating cylinder 12, the injection sleeve 17 is moved upward together with the injection sleeve 17 and connected to the stationary sleeve 109.

Reference numeral 18 denotes a supporting frame having a boss portion 18a formed at a position where its outer circumferential portion is divided into two parts in the circumferential direction and supported by the elevating shaft 13 via a linear ball bearing 19. The descent limit of the supporting frame 18 is regulated by a nut 20 threadably engaged with a threaded portion of the elevating shaft 13. The supporting frame 18 is supported to be movable upward/downward by a pair of parallel screw shafts 21 having a substantially 60° phase difference in the circumferential direction with respect to the elevating shaft 13. That is, a saucer-like intermediate frame 22 is located in a space between the supporting frame 18 and the lower frame 11 and open downward, and a pair of bearing holes are formed at positions corresponding to the screw shafts 21. A small-diameter portion of the screw shaft 21 is axially supported by the bearing hole via a bearing 23 and a thrust bearing 24. A movement of the screw shaft 21 in the axial direction with respect to the intermediate frame 22 is regulated by its step portion, a sprocket 25 fixed to the small-diameter portion by a key, and a nut 26 threadably engaged with the threaded portion. A motor 27 with a brake 27A and a pair of idlers 28 and 29 are mounted on the intermediate frame 22. A chain 31 is looped between a sprocket 30 of the motor 27, the idlers 28 and 29, and the sprocket 25 on the screw shaft 21. Therefore, the screw shaft 21 is rotationally driven by the motor 27 via the chain 31. A plurality balls 32 are aligned and held in a spiral groove in the screw shaft 21. A ball holder 33 fitted in and fixed to a holder hole 18b of the supporting frame 18 by a bolt is fitted on the screw shaft 21, and balls 32 are held in a spiral ball groove formed in its inner hole. With this arrangement, when the screw shaft 21 rotates, the supporting frame 18 moves upward/downward while the balls 32 roll in the ball groove. A plunger 34 coupled by a coupling 35 extends upward from the central portion of the supporting frame 18. A plunger tip 34a as a head portion of the plunger 34 is inserted to be movable forward/backward in the inner hole. With this arrangement, a molten metal teemed in the inner hole of the injection sleeve 17 is pushed by the plunger tip 34a upon upward movement of the plunger 34 and injected into a die cavity via the stationary sleeve. Reference numeral 36 is a cover having a semicircular section and supported by a cover 37 fixed to the supporting frame 18 to cover the screw shaft 21 together with the cover 37. The cover 36 is arranged to project integrally with the supporting frame 18 along and above the upper frame 15. A water cooling conduit 38 extends through the central portion of the plunger 34 and opens to the outer circumferential portion of the supporting frame 18. A hose mounted on the opening portion is connected to a cooling pump (not shown). A lower opening end of the intermediate frame 22 is closed by an oil receiving plate 39. A saucer-like oil pan 40 is formed in the inner surface of the oil receiving plate 39 to surround the screw shaft 21.

A member generally denoted by reference numeral 41 is a molten metal urging cylinder disposed below each screw shaft 21. The molten metal urging cylinder 41 includes a cylinder hole 11a having upper and lower portions closed by cover member 42 and 43 and formed in the lower frame 11, and a piston 44 fitted to be movable forward/backward in the cylinder hole 11a. A lower cylinder chamber at the lower portion of the piston 44 is connected to a hydraulic device via an oil passage 45 and a conduit. A gap of about 1 mm denoted by reference symbol t is formed between the lower end descent limit of the screw shaft 21 and the upper end descent limit of the piston 44. With this arrangement, after the plunger tip 24 moves upward and a molten metal is filled in a cavity, an oil is supplied to the lower portion of the piston 44 to move the piston 44 upward. The piston 44 is brought into contact with the screw shaft 21 and further moved upward by about 5 mm. As a result, the plunger 34 is moved upward via the supporting frame 18 to perform a molten metal urging operation.

An operation of the injection apparatus having the above arrangement will be described below. When the entire injection apparatus 3 is pushed to the right in FIG. 2 (to the depth of FIG. 4) by the driving device 130, the injection apparatus 3 moves to the metal mold teeming position indicated by the alternate long and two short dashed lines in FIG. 1 while the balls 6 of the linear guide 2 roll in the ball groove, thereby teeming the molten metal into the injection sleeve 17. After the teeming, the injection apparatus 3 is returned to the lower position (indicated by the solid line in FIG. 2) of the injection position.

When an oil is supplied from the oil supply source 135 to the ram hole 12a of the elevating cylinder 12, the elevating shaft 13 moves upward while the balls of the linear ball bearings 14 and 19 roll, and the injection sleeve 17 formed integrally with the elevating cylinder 12 is moved upward and connected to the metal mold stationary sleeve 109. In this case, the supporting frame 18 is urged against the nut 20 and moved upward by a ball screw device constituted by the screw shaft 21, the balls 32, and the ball holders 33, and the plunger tip 34a moves upward in synchronism with the injection sleeve 17, i.e., while maintaining the same positional relationship with respect to the injection sleeve 17. Therefore, the molten metal does not overflow from the injection sleeve 17.

After the injection sleeve 17 moves upward to its ascent limit and stops, the plunger 34 starts upward movement. First, when the motor 29 is started under the control of a control unit 145 to rotate the two screw shafts 21 in synchronism with each other via the chain 31, the supporting frame 18 moves upward by the screw shafts 21 while the balls 32 roll in the grooves and the linear ball bearings 19 move along the elevating shaft 13. The plunger 34 and the plunger tip 34a with the supporting frame 18 move upward relatively to the sleeve frame 15. As a result, the plunger tip 34a moves upward in the injection sleeve 17, and the molten metal is injected in the die cavity 107 via the stationary sleeve 109 shown in FIG. 1.

Figure 4:
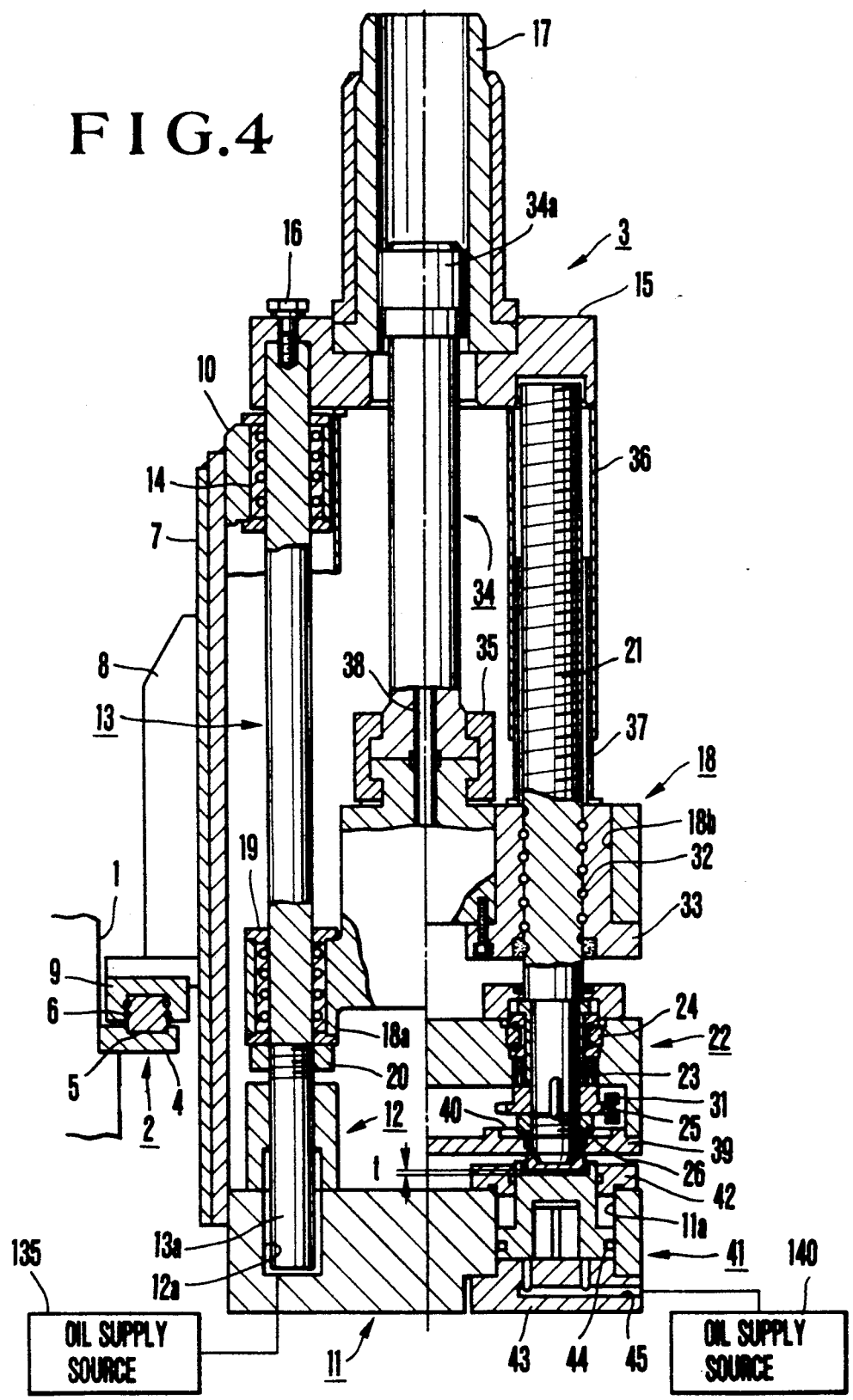

After the molten metal is filled in the die cavity 107, the motor 27 is stopped under the control of the control unit 145. During injection, the intermediate frame 22 is not moved upward but kept stopped. When the molten metal is completely filled in the cavity, an oil is supplied to the lower portion of the piston 44 of the molten metal urging cylinder 41 to move the piston 44 upward. The piston 44 is brought into contact with the screw shafts 21 to move the screw shafts 21 upward together with the intermediate frame 22 by about 5 mm. Therefore, the supporting frame 18 moves upward with the plunger tip 34a, and the molten metal in the cavity 107 is compressed to perform the molten metal urging operation. During such an injection operation, the plunger 34 is cooled since cooling water is supplied to and circulated in a water cooling conduit (FIG. 4).

When the injection operation is finished, die opening is performed after an injection product is cooled and solidified, and the piston 44 of the molten metal urging cylinder 41 is moved backward. The brake 27A formed integrally with the motor 27 is released, and the motor 27 is driven to move the supporting frame 18 backward via the ball screw device, thereby moving the plunger tip 34a backward. When the plunger tip 34a and the supporting frame 18 are moved backward to predetermined positions, the supporting frame 18 contacts with the nut 20 for pushing it, and the elevating shaft 13, the supporting frame 18, and the injection sleeve 17 are simultaneously moved backward. Thereafter, the injection apparatus 3 is moved to the metal mold teeming position indicated by the alternate long and two short dashed lines in FIG. 2, thereby finishing one cycle.

Note that the injection apparatus 3 may be moved to the metal mold teeming position by tilting as in a conventional apparatus. In the apparatus according to the present invention, however, the height of the entire apparatus is decreased to be much smaller than that of a conventional hydraulic injection cylinder. Therefore, since a tilting angle is increased to reduce a filling amount, a horizontal moving system as in the above embodiment is preferred.

In the above embodiment, the ball screw device is exemplified as a rotational-linear motion transmission mechanism for transmitting the motion of the motor to the supporting frame. The ball screw device, however, may be a normal screw device constituted by a screw shaft and a nut to be threadably engaged with the screw shaft or a transmission mechanism constituted by a rack and a pinion. If the above ball screw device or a normal screw device is to be used, either a screw shaft side or a ball holder or nut side may be rotationally driven.

In addition, according to the above embodiment, the present invention is applied to the vertical die casting machine. The present invention, however, can be applied to a horizontal die casting machine and can be similarly applied to a plastic injection molding machine to obtain the same effects.

As is apparent from the above description, according to the present invention, an injection apparatus comprises a plunger supported at a substantially central portion of a supporting frame, an injection sleeve, provided to be movable forward/backward with respect to the supporting frame, for receiving a distal end portion of the plunger such that the distal end portion can move forward/backward, a sleeve frame for supporting the injection sleeve, and a rotational-linear motion transmission mechanism, arranged between a motor and the supporting frame, for converting a rotational motion into a linear motion. In addition, in the apparatus according to the present invention, the rotational-linear motion transmission mechanism comprises a screw shaft to be rotated by the motor, a plurality of balls to be engaged with a spiral groove of the screw shaft, and a ball holder fixed to the supporting frame to support the balls. Therefore, since a conventional hydraulic apparatus can be an electrical apparatus, its controllability can be improved, and the entire apparatus can be made compact. In particular, since the length in the longitudinal direction can be largely reduced, the size of an installation space can be reduced. For example, in the case of a conventional vertical type, a deep pit is required to install an injection apparatus. According to the present invention, no pit or only a shallow pit is required.

Furthermore, since the plunger moves upward while the balls roll, the movement is smoothly performed to improve the injection function. In addition, since the injection sleeve can be moved upward while the screw shafts are rotated, the operation can be successively performed from connection to injection of the injection sleeve, thereby shortening the injection cycle. Note that if a push cylinder for pushing the screw shaft after a molten metal is filled in the die cavity is provided behind the screw shaft, the molten metal urging operation upon injection can be reliably performed at a good timing. As a result, a high-quality injected product can be easily and reliably obtained.

Moreover, with the above structure, the hose mounting port of the cooling conduit for cooling the plunger tip can be provided at an opening position to external equipment separated from the plunger tip. Therefore, assembling and maintenance can be easily performed. In addition, since a hose can be mounted in a position where a temperature is not much increased, the service life of the hose can be prolonged.

Figure 5:
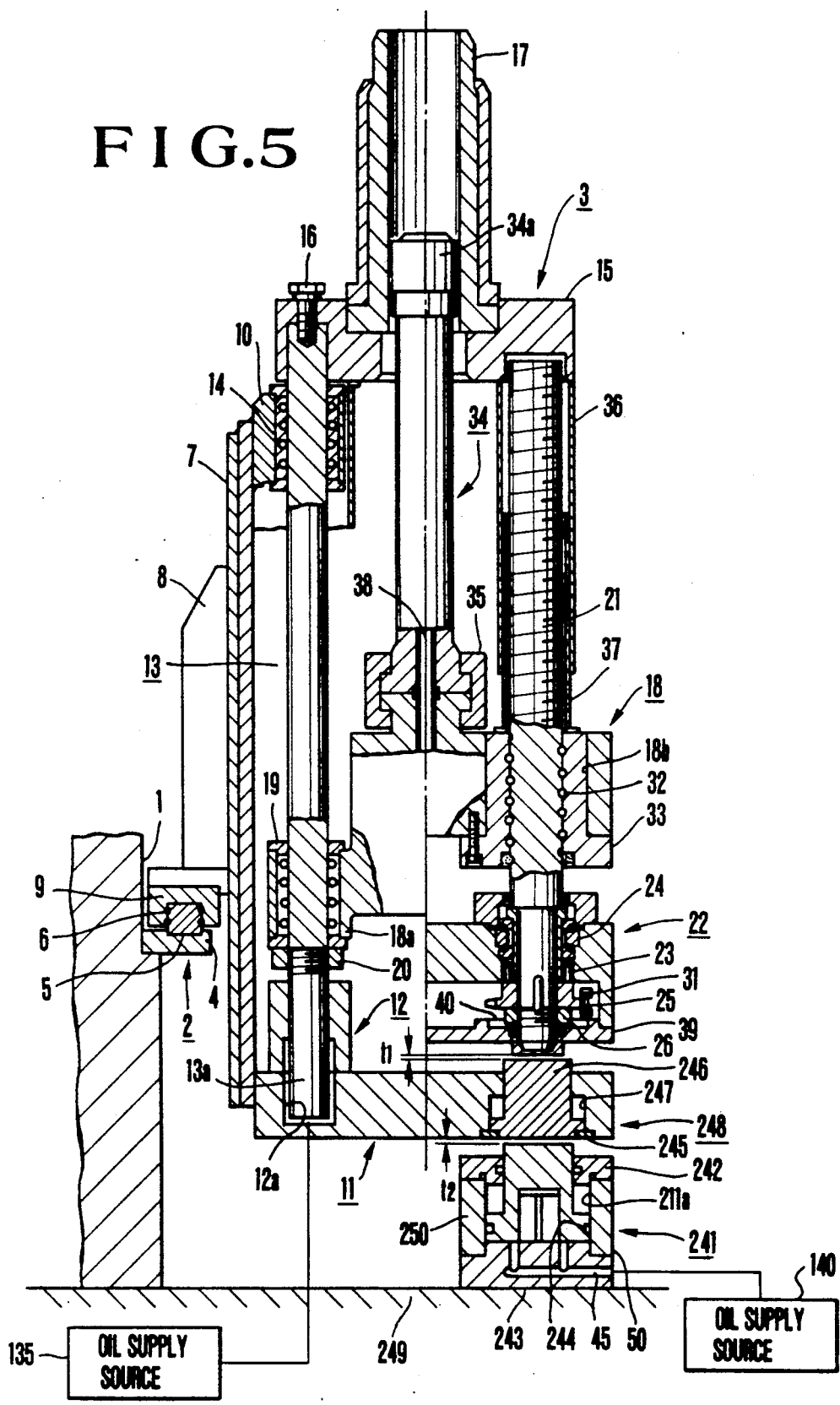
FIG. 5 is a sectional view showing the injection apparatus according to another embodiment of the present invention.

FIG. 5 shows another embodiment of the present invention. This embodiment differs from the above embodiment in that a molten metal urging cylinder is not moved integrally with a plunger 34 but fixed to a stationary base 249. Only a difference between this embodiment and the above embodiment will be described below.

That is, reference numeral 248 denotes an intermediate push-out portion which is a feature of this embodiment. The intermediate push-out portion 248 is disposed below each screw shaft 21 and includes a hole portion 247 closed by a cover member 245 and formed in a lower frame 11 and a splined shaft 246 having a lower projecting portion fitted to be movable forward/backward in the hole portion 247 and an upper portion fitted to be movable upward/downward in the lower frame 11.

A member generally denoted by reference numeral 241 is urging means as a drive source for moving the splined shaft 246 of the intermediate push-out portion 248 upward/downward. In this embodiment, a molten metal urging cylinder 241, for example, is used as the urging means and placed on a stationary base 249 so as to start an operation when an injection apparatus 3 is set at an injection position. A cylinder 250 has an upper cylinder hole 211a having upper and lower portions closed by cover members 242 and 243 and a lower piston 244 fitted to be movable forward/backward in the cylinder hole 211a. A lower cylinder chamber located below the piston 244 is connected to a hydraulic device 140 via an oil passage 245 formed in the cover member 243 and conduits. A gap having a width of about 1 mm and denoted by reference symbol $t_1$ in FIG. 5 is formed between the lower end descent limit of the screw shaft 21 and the upper end descent limit of the splined shaft 246. In addition, a gap having a width of about 3 mm and denoted by reference symbol $t_2$ in FIG. 5 is formed between the lower end descent limit of the splined shaft 246 and the upper end descent limit of the piston 244. With this arrangement, when an oil is supplied from the hydraulic device 140 to the lower portion of the piston 244 to move the piston 244 upward after the plunger tip 24 moves upward to fill a molten metal in a cavity 107, the piston 244 is brought into contact with the splined shaft 246 and then further moved upward by about, e.g., 5 mm. Similarly, after the splined shaft 246 is brought into contact with the screw shaft 21, the screw shaft 21 is moved upward by about, e.g, 5 mm to move the plunger 34 upward via a supporting frame 18, thereby performing a molten metal urging operation.

An operation of the injection apparatus having the above arrangement will be described below. When the entire injection apparatus 3 is pushed in the direction of the lower drawing surface by a driving device, the injection apparatus 3 moves to a molten metal teeming position while balls 6 of a linear guide 2 roll in ball grooves. Therefore, the molten metal is teemed in an injection sleeve 17. After the teeming, the injection apparatus 3 is returned to a lower position of an injection position.

When an oil is supplied to a ram hole 12a of an elevating cylinder 12, an elevating shaft 13 is moved upward while balls in linear ball bearings 14 and 19 roll, and the injection sleeve formed integrally with the elevating shaft 13 is moved upward and connected to a stationary sleeve of a metal mold. At this time, a supporting frame 18 is pushed by a nut 20 and moved upward by a ball screw device constituted by the screw shaft 21, balls 32, and ball holders 33. As a result, a plunger tip 34a moves upward while maintaining the same positional relationship with respect to the injection sleeve 17. Therefore, the molten metal does not overflow from the injection sleeve 17.

A motor 29 is started to rotate the two screw shafts 21 in synchronism with each other via a chain 31. As a result, the supporting frame 18 moves upward by an action of the screw shafts 21 while the balls 32 roll in the grooves and the linear bearings 19 move along the elevating shaft 13, and the plunger 34 and the plunger tip 34a formed integrally with the supporting frame 18 move upward. Therefore, the molten metal in the injection sleeve 17 is injected into the die cavity via the stationary sleeve.

After the molten metal is filled in the die cavity 107, the motor 27 is stopped. During injection, the intermediate frame 22 is not moved upward but kept stopped. When the molten metal is completely filled in the cavity, an oil is supplied to the lower portion of the piston 244 of the molten metal urging cylinder 241 to move the piston 244 upward. The piston 244 is brought into contact with the splined shaft 246, and the splined shaft 246 is brought into contact with the screw shaft 21, thereby moving the screw shaft 21 together with the intermediate frame 22 by about, e.g., 5 mm. Therefore, the supporting frame 18 moves upward together with the plunger tip 34a to compress the molten metal in the cavity, thereby performing a molten metal urging operation. Since cooling water is supplied to and circulated in a water cooling conduit 38 during the above injection operation, the plunger 34 is cooled.

After the injection operation is finished and an injected product is cooled and solidified, the molds are opened, and the piston 244 of the molten metal urging cylinder 241 is moved backward. The motor 27 in which a brake is released is driven to move the supporting frame 18 backward via the ball screw devices, thereby moving the plunger tip 34a backward. When the plunger tip 34a and the supporting frame 18 move backward to predetermined positions, the supporting frame 18 pushes the nut 20, and the elevating shaft 13 and the injection sleeve 17 simultaneously move backward. Thereafter, the injection apparatus 3 is moved to the metal mold teeming position, thereby finishing one cycle.

In this embodiment, the molten metal urging cylinder is separated from the injection apparatus main body and activated when the injection apparatus moves to the molten metal teeming position. As a result, the screw shaft is moved upward via the splined shaft to move the plunger upward via the supporting frame, thereby performing the molten metal urging operation. Therefore, a reaction force acting on the supporting member for supporting the injection apparatus and laterally moving upon molten metal urging can be reduced. As a result, the thickness of the supporting member can be reduced to reduce the weight of the apparatus. In addition, since no flexible conduit is used as a pressurized oil conduit to the molten metal urging cylinder, safety is significantly improved.

What is claimed is:

1. An injection apparatus comprising:
a plunger supported at a substantially central portion of a supporting frame;
an injection sleeve, provided to be relatively movable upward/backward with respect to said supporting frame, for receiving a distal end portion of said plunger such that said distal end portion can move upward/backward;
first, moving means for vertically moving the injection sleeve upward/backward so as to be concentric with a mold;
a sleeve frame for supporting said injection sleeve;
a rotational-linear motion transmission mechanism, arranged between a motor and said supporting frame, for converting a rotational motion into a linear motion;
second, moving means for vertically moving a screw shaft to generate a squeezing force via the plunger, said second moving means being adjacent to a lower end of said screw shaft means for rotating said screw shaft to generate an injecting force, wherein rotation of said screw shaft in a first direction increase said injecting force, and rotation of said screw shaft in a second direction decreases said injecting force;

wherein said second moving means and said rotating means causes molten material within said injection sleeve to fill a cavity;

whereby flow of said molten material and filling of said cavity can be controlled smoothly, easily and accurately.

2. An apparatus according to claim 1, wherein said rotational-linear motion transmission mechanism comprises:
 a screw shaft to be rotated by said motor;
 a plurality of balls to be engaged with a spiral groove of said screw shaft; and
 a ball holder fixed to said supporting frame to support said balls.

3. An apparatus according to claim 1, wherein said rotational-linear motion transmission mechanism comprises:
 a plurality of screw shafts to be rotated by said motor;
 a plurality of balls to be engaged with a spiral groove of each of said screw shafts; and
 a ball holder fixed to said supporting frame to hold said balls corresponding to each screw shaft.

4. An apparatus according to claim 3, further comprising:
 a lower frame for supporting said elements of said apparatus in a predetermined positional relationship; and
 an intermediate frame arranged between said lower frame and said supporting frame,
 said intermediate frame supporting a lower portion of said screw shaft via a thrust bearing.

5. An apparatus according to claim 1, wherein said moving means is mounted in said lower frame.

6. An apparatus according to claim 4, wherein said moving means is mounted on a stationary base.

7. An apparatus according to claim 6, wherein said lower frame is arranged between said moving means mounted on said stationary base and the lower end of said screw shaft.

8. An apparatus according to claim 7, wherein a splined shaft moved upward by driving said moving means to push said screw shaft upward is mounted in said lower frame.

9. An apparatus according to claim 6, wherein said moving means is arranged below an injection position.

10. An apparatus according to claim 1, further comprising:
 an elevating shaft having one end fixed to said sleeve frame; and
 a lower frame for slidably supporting the other end of said elevating shaft.

11. An apparatus according to claim 10, wherein a ram structure is arranged between a lower end portion of said elevating shaft and an elevating shaft holding portion of said lower frame.

12. An apparatus according to claim 10, wherein an upper surface of a projecting portion located below said elevating shaft is provided to be brought into contact with or separated from a part of a lower surface of said supporting frame; when said elevating shaft moves upward, said projecting portion is pushed up said supporting frame to move said distal end portion of said plunger upward in synchronism with said injection sleeve; when said supporting frame is moved upward after said injection sleeve stops at an ascent limit, said plunger tip 34a moves upward in said injection sleeve 17; and when said supporting frame and said plunger move downward and said supporting frame and said projecting portion are in contact with each other during the downward movement, said elevating shaft is pushed down by said supporting frame.

13. An apparatus according to claim 10, wherein the number of each of said screw shafts and said elevating shafts is two, and said screw shafts and said elevating shafts are arranged symmetrically about said plunger.

14. An apparatus according to claim 10, wherein said supporting frame is supported to be movable upward/downward by said elevating shaft via linear ball bearings.

15. An apparatus according to claim 1, wherein said injection sleeve is movable between an injection position and a molten metal supply position.

* * * * *